United States Patent
Heidingsfelder et al.

(10) Patent No.: US 10,302,123 B2
(45) Date of Patent: May 28, 2019

(54) COUPLING ROD

(71) Applicant: BorgWarner Inc., Auburn Hills, MI (US)

(72) Inventors: Leif Heidingsfelder, Ramstein (DE); Nico Kanoffsky, Bolanden (DE); Ralf Christmann, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/254,046

(22) Filed: Sep. 1, 2016

(65) Prior Publication Data

US 2016/0369836 A1   Dec. 22, 2016

Related U.S. Application Data

(62) Division of application No. 14/395,574, filed as application No. PCT/US2013/037282 on Apr. 19, 2013, now abandoned.

(30) Foreign Application Priority Data

Apr. 27, 2012   (DE) ........................ 10 2012 008 587

(51) Int. Cl.

| | |
|---|---|
| *F16C 7/06* | (2006.01) |
| *F16D 1/06* | (2006.01) |
| *F01D 17/16* | (2006.01) |
| *F02B 37/24* | (2006.01) |
| *F16C 7/02* | (2006.01) |

(52) U.S. Cl.
CPC ................ *F16C 7/06* (2013.01); *F01D 17/16* (2013.01); *F02B 37/24* (2013.01); *F16C 7/02* (2013.01); *F16D 1/06* (2013.01); *F01D 17/165* (2013.01); *F05D 2220/40* (2013.01); *F16C 2226/36* (2013.01); *Y02T 10/144* (2013.01); *Y10T 74/2151* (2015.01)

(58) Field of Classification Search
CPC .. F16C 7/06; F01D 17/16; F02B 37/24; F16D 1/06; F16D 1/076; F05D 2220/40
See application file for complete search history.

(56) References Cited

U.S. PATENT DOCUMENTS

| | | | | |
|---|---|---|---|---|
| 891,435 | A | * | 6/1908 | Palmer ...................... F16C 7/06 100/257 |
| 2,581,048 | A | * | 1/1952 | Schaefer ................ B23K 5/006 403/268 |
| 2,592,280 | A | * | 4/1952 | Herbenar ................ B62D 7/16 74/579 F |
| 2,813,733 | A | * | 11/1957 | Herrmann ............... F16G 11/12 403/44 |
| 3,013,437 | A | * | 12/1961 | Harding .................... F16C 3/28 74/469 |

(Continued)

*Primary Examiner* — Vicky A Johnson
(74) *Attorney, Agent, or Firm* — Eric L. Doyle; Stephan A. Pendorf; Patent Central LLC

(57) ABSTRACT

A coupling rod fitting (1) having a first end piece (2); a second end piece (3); and having an intermediate piece (4) which connects the first end piece (2) and the second end piece (3). The intermediate piece (4) is formed as a connecting rod and the first end piece (2) and the second end piece (3) have in each case one sleeve (5 and 6 respectively), which sleeves are pushed onto the connecting rod (4) and are fixed in an adjustable final assembly position on the connecting rod (4).

8 Claims, 7 Drawing Sheets

(56) References Cited

U.S. PATENT DOCUMENTS

| | | | | |
|---|---|---|---|---|
| 3,786,695 | A * | 1/1974 | Barrett, Jr. | B64C 27/54 |
| | | | | 403/43 |
| 3,938,822 | A * | 2/1976 | Guerriero | B60G 21/0551 |
| | | | | 280/86.758 |
| 4,146,340 | A * | 3/1979 | Smith, Jr. | B62D 7/20 |
| | | | | 280/93.507 |
| 9,435,220 | B2 * | 9/2016 | Alajbegovic | F01D 17/20 |
| 9,562,537 | B2 * | 2/2017 | Heidingsfelder | F02B 39/00 |
| 10,208,658 | B2 * | 2/2019 | Navarro | F02B 37/186 |
| 2003/0185672 | A1 * | 10/2003 | Suganami | F02B 37/186 |
| | | | | 415/150 |

* cited by examiner

COUPLING ROD

CROSS REFERENCE TO RELATED APPLICATIONS

The present application is a divisional of U.S. patent application Ser. No. 14/395,574 filed Oct. 20, 2014, entitled COUPLING ROD, which is a National Stage Entry of PCT/US2013/037282 filed Apr. 19, 2013, which claims priority from DE Patent application 10 2012 008 587.7 filed Apr. 27, 2012. All applications are incorporated herein by reference in their entireties.

BACKGROUND OF THE INVENTION

Field of the Invention

The invention relates to a coupling rod fitting and a method for connecting an actuator of a VTG turbocharger to an outside lever of a VTG cartridge of the VTG turbocharger using the coupling rod fitting.

Description of the Related Art

Coupling rods are used for connecting an actuator, in particular an electric actuator which is mounted for example on a compressor housing of a compressor of an exhaust-gas turbocharger, to an outside lever of a so-called VTG cartridge. As a result of an actuation of the actuator, the coupling rod is moved axially and the outside lever is pivoted, which in turn rotates an adjusting ring of the VTG cartridge, and thus the vanes of the VTG cartridge are moved between an open position and a closed position.

It is an object of the present invention to provide a coupling rod fitting for forming a coupling rod, which fitting is of simple and thus inexpensive design and which permits axial length compensation.

BRIEF SUMMARY OF THE INVENTION

By virtue of the fact that the coupling rod fitting has two sleeve-like end pieces which can be pushed onto a rod-like intermediate piece, it is possible in a simple manner for the effective length of the coupling rod to be adjusted and for the set final assembly position on the intermediate piece to be fixed, preferably by means of a welded connection.

The dependent claims contain advantageous developments of the invention.

In addition to a simple technical construction which can be assembled easily and in a reliable manner, there is the resulting advantage that identical parts can be used for exhaust-gas turbochargers with flap end pieces and control capsule end pieces.

BRIEF DESCRIPTION OF THE SEVERAL VIEWS OF THE DRAWINGS

Further details, advantages and features of the present invention become apparent from the following description of exemplary embodiments with reference to the drawing, in which.

DETAILED DESCRIPTION OF THE INVENTION

Figure 1:
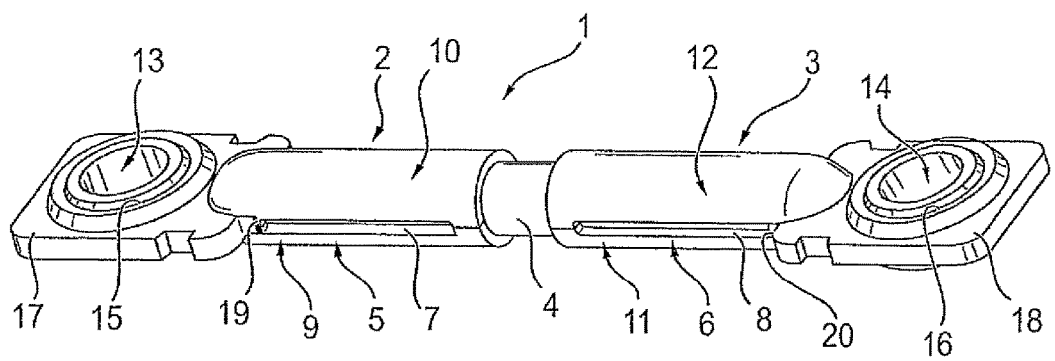
FIG. 1 shows a perspective illustration of a first embodiment of a coupling rod according to the invention.

FIG. 1 illustrates a first embodiment of a coupling rod fitting 1 which comprises a first end piece 2 and a second end piece 3. The end pieces 2 and 3 are pushed onto the intermediate piece 4, which is formed as a connecting rod.

As FIG. 1 also shows, the first end piece 2 has a sleeve 5 and the second end piece 3 has a sleeve 6, said sleeves being pushed onto the connecting rod 4 and fixed on the connecting rod 4 in the final assembly position illustrated in FIG. 1.

To realize the fixing, it is preferable for a welded connection to be provided, for this purpose, in the embodiment illustrated in FIG. 1, the sleeves 5 and 6 have in each case one welding window 7 and 8 respectively, into which the weld material can be introduced.

The sleeves 5 and 6 are assembled in each case from two sheet-metal halves 9, 10 (in the case of sleeve 5) or sheet-metal halves 11, 12 (in the case of sleeve 6).

As FIG. 1 also shows, the sleeves 5 and 6 have in each case one compensating ball joint 13 and 14 respectively. Here, the compensating ball joints 13 and 14 are arranged in in each case one receiving recess 15 and 16 respectively in an associated holding plate 17 (in the case of sleeve 5) or 18 (in the case of sleeve 6).

Here, the holding plate 17 is inserted into an associated insertion slot 19 of the sleeve 5 and the holding plate 18 is inserted into an associated insertion slot 20 of the sleeve 6, and said holding plates are fixed in said insertion slots 19 and 20 respectively, for example by means of a welded connection.

As FIG. 1 shows, the insertion slots 19 and 20 merge into the respectively associated welding windows 7 and 8.

In the embodiment of FIG. 1, the connecting rod 4 is of straight form.

Figure 2:
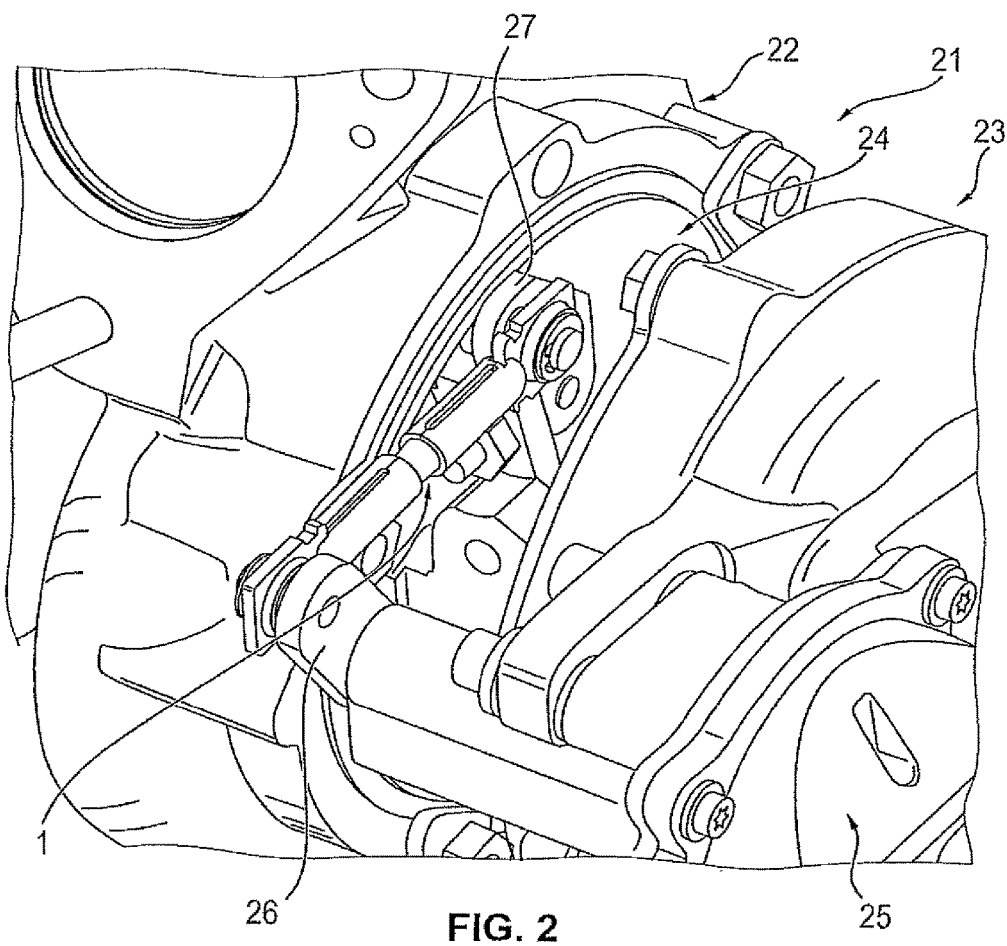
FIGS. 2 and 3 show a first installation situation of the coupling rod as per FIG. 1 on an exhaust-gas turbocharger embodiment.
Figure 3:
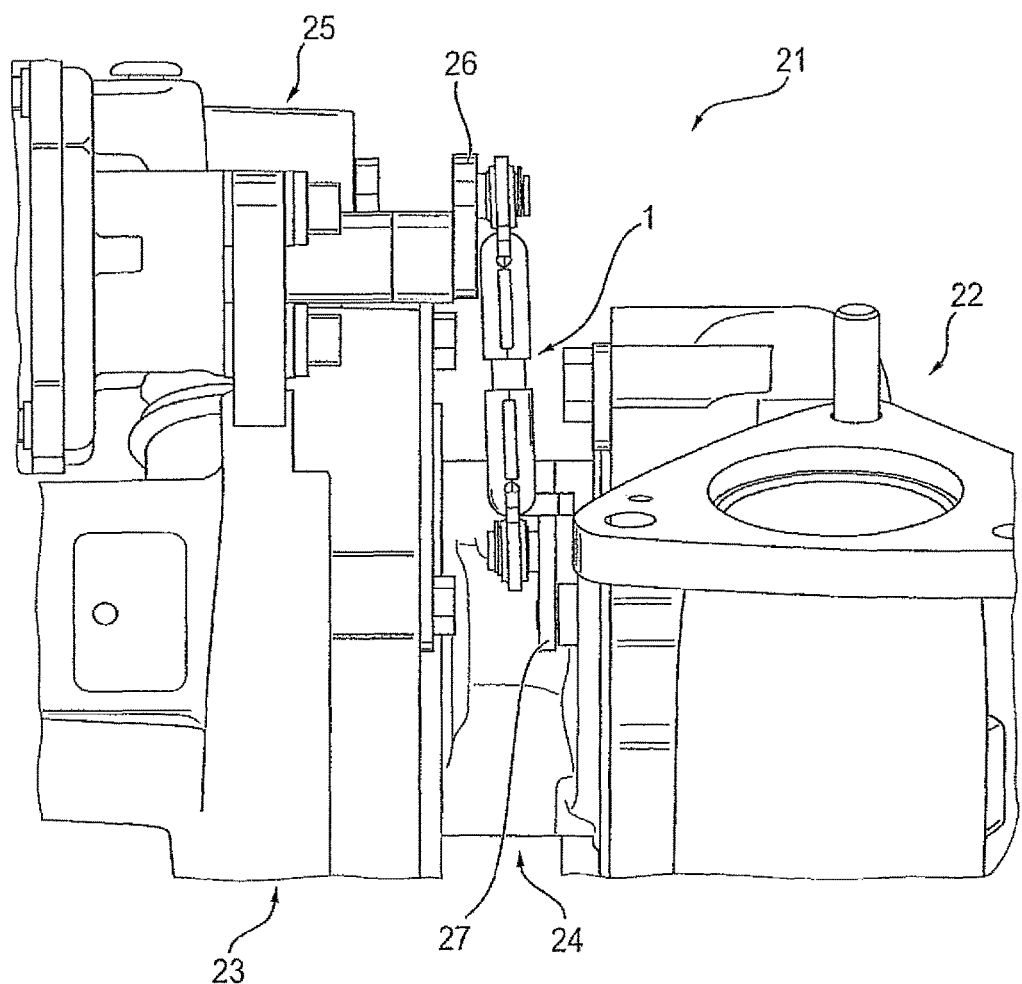

FIGS. 2 and 3 illustrate a first embodiment of an exhaust-gas turbocharger 21 according to the invention which has a turbine 22 and a compressor 23. Between the turbine 22 and the compressor 23 there is arranged a bearing housing 24.

To the compressor 23 there is fastened an actuator 25 which has an actuator lever 26 which is connected to one of the two compensating ball joints of the coupling rod 1 as per FIG. 1.

Also shown is an outside lever 27 of a VTG cartridge which is not illustrated in detail in FIG. 3. A VTG cartridge is understood to mean a structural unit which, between a vane bearing ring and a disk, delimits an inflow duct for the passage of exhaust gases to the turbine wheel. A VTG cartridge of said type also has a multiplicity of vanes which are arranged in the inflow region. The vanes can be moved rotatably in the vane bearing ring between a closed and an open position. For this purpose, the vanes have vane shafts each having an axis of rotation. The vane shafts in turn are connected to vane levers each having a lever head which engages into an associated groove of an adjusting ring. The adjusting ring of a VTG cartridge of said type is connected to the coupling rod 1 via a lever mechanism, wherein the outside lever 27 of the lever mechanism is visible in FIG. 3. Owing to the construction, explained above and illustrated in FIG. 1, of the coupling rod 1 according to the invention, it is possible for the effective length of the coupling rod to be varied by varying the weld position of the end pieces 2 and 3.

Figure 4:
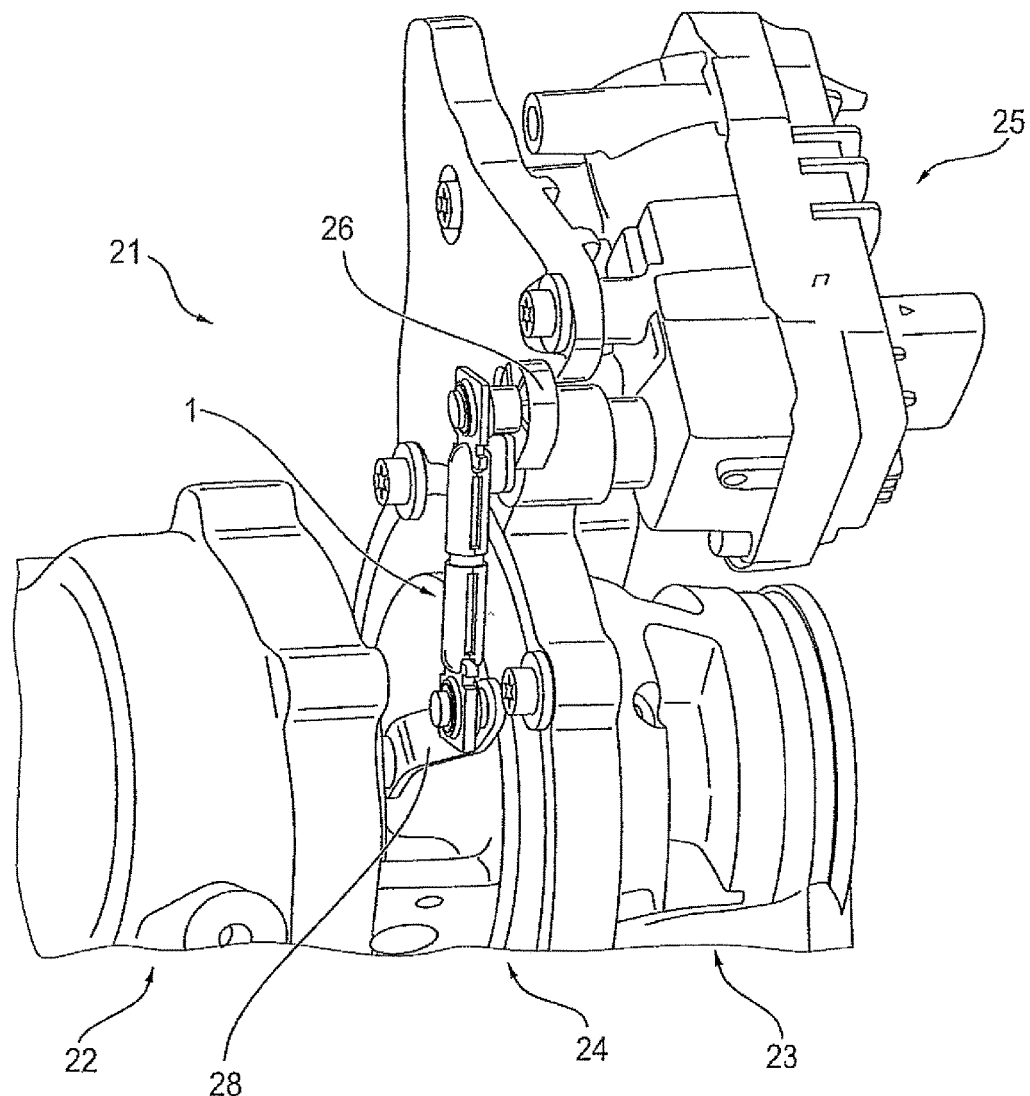
FIG. 4 shows a second installation situation of the coupling rod according to the invention as per FIG. 1 in a further exhaust-gas turbocharger embodiment.

Through the use of the compensating ball joints 13 and 14 described on the basis of FIG. 1, it is possible to accept a small axial offset without there being any influence on the hysteresis of the overall system as per FIGS. 3 and 4. The mounting of the coupling rod 1 in the case of different alignments of the actuator 25 and of the VTG outside lever 27 is therefore made considerably easier.

FIG. 4 shows a further embodiment of an exhaust-gas turbocharger 21 according to the invention, wherein all of the components explained above with reference to FIGS. 2 and 3 are denoted by the same reference numerals.

In this embodiment, too, the coupling rod 1 connects the actuator lever 26 to a VTG outside lever 28, which in this case is of cranked form. In this embodiment of the exhaust-gas turbocharger 21, the coupling rod 1 permits mounting in the case of identical alignment of the actuator and of the VTG outside lever.

Figure 5:
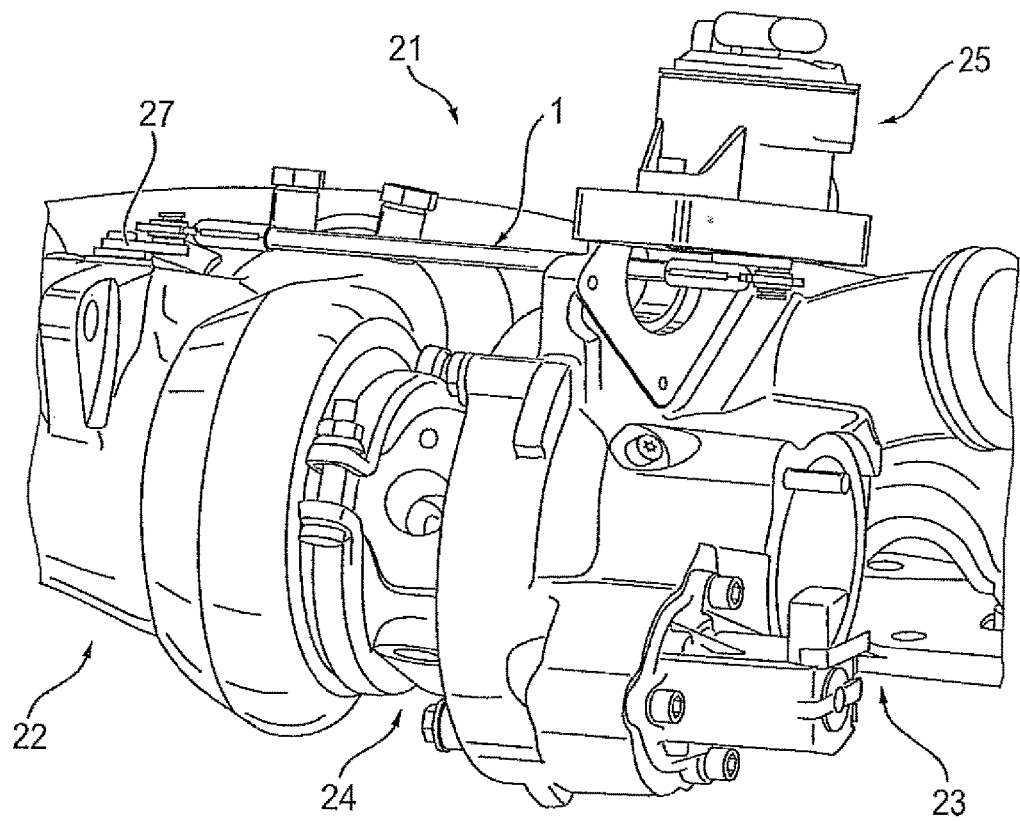
FIG. 5 shows the installation situation of the coupling rod as per FIG. 1 in an exhaust-gas turbocharger with a flap-type VTG.

FIG. 5 illustrates a so-called flap-type exhaust-gas turbocharger 21 which can likewise be equipped with the coupling rod 1 according to the invention. The construction of the coupling rod 1 which has been explained on the basis of FIG. 1 makes fitting in difficult installation situations in exhaust-gas turbochargers of said type significantly easier.

Figure 6:
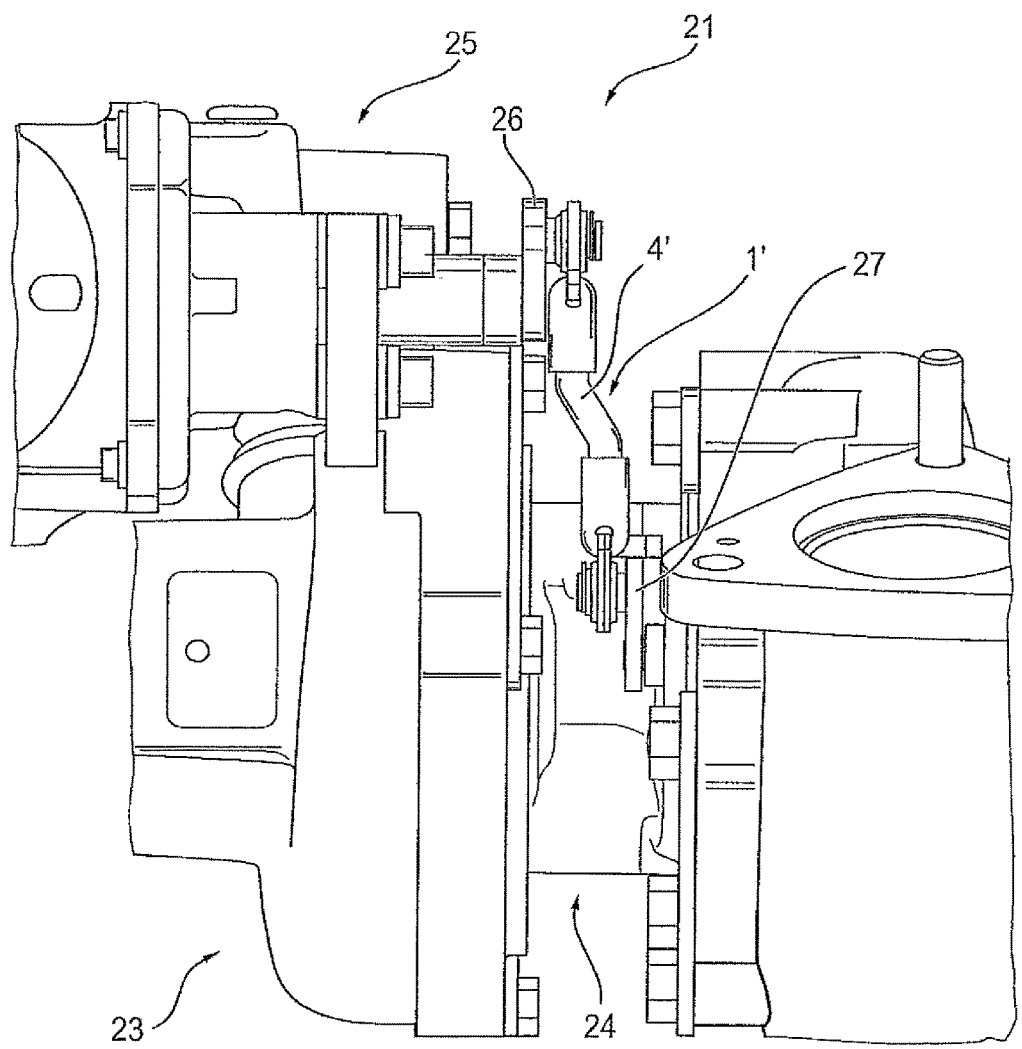
FIG. 6 shows a second embodiment of the coupling rod according to the invention with cranked intermediate piece in the installed state in a further embodiment of an exhaust-gas turbocharger according to the invention.

FIG. 6 shows a further embodiment of an exhaust-gas turbocharger 21 according to the invention, in which use is however made of a coupling rod 1', the connecting rod 4' of which is of cranked form, as can be seen from FIG. 6. Said cranked configuration of the connecting rod 4' permits a further variant for adaptation to different turbocharger designs. The construction of the coupling rod 1' otherwise corresponds to that of the coupling rod 1 of FIG. 1.

Figure 8:
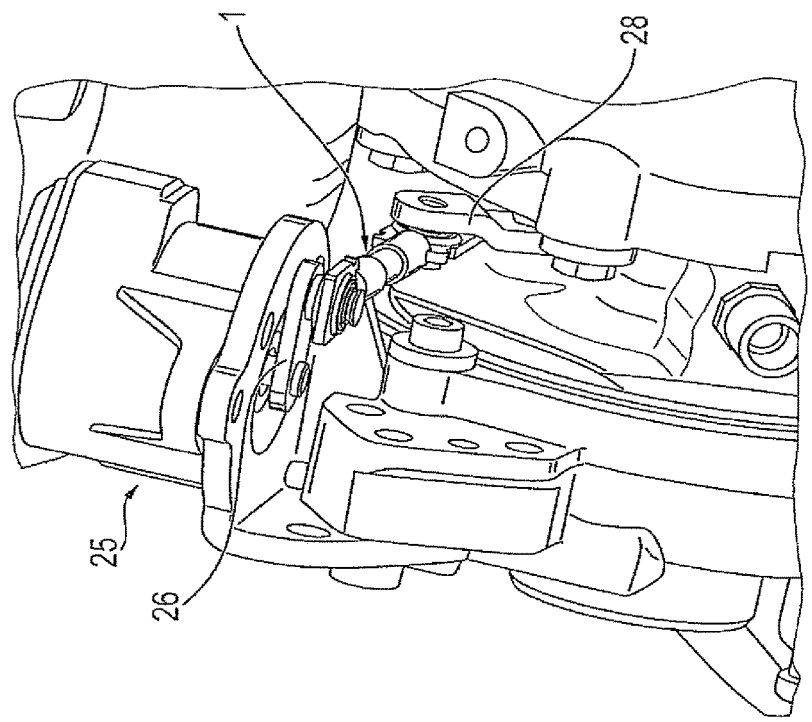
FIGS. 7 and 8 show the installation situation of the coupling rod as per FIG. 1 in an exhaust-gas turbocharger in which the actuator (electric actuator) is installed with a direction of action which differs from the direction of action of the outside lever of the VTG.
Figure 7:
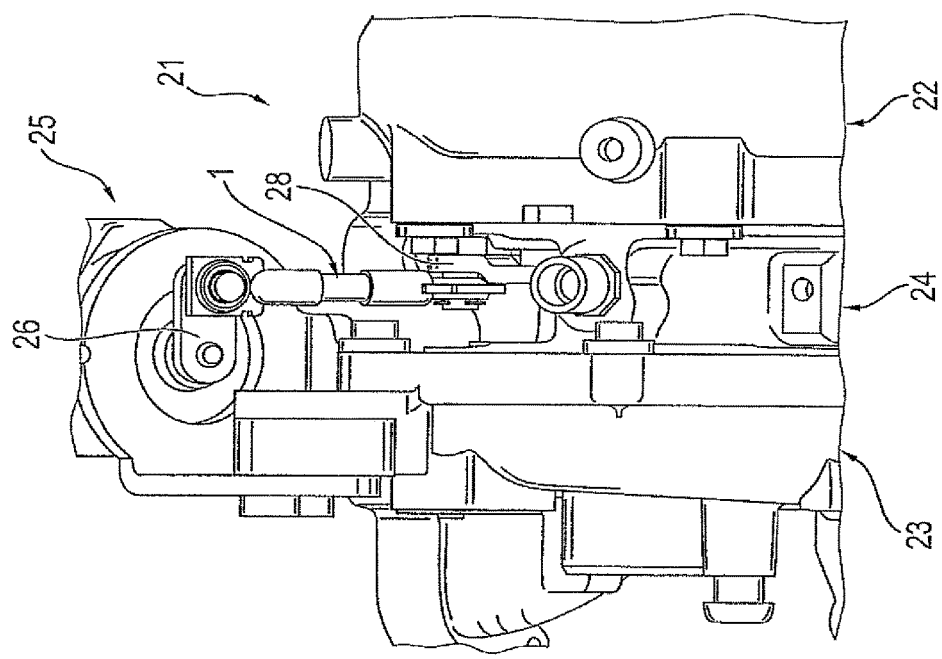
Figure 9:
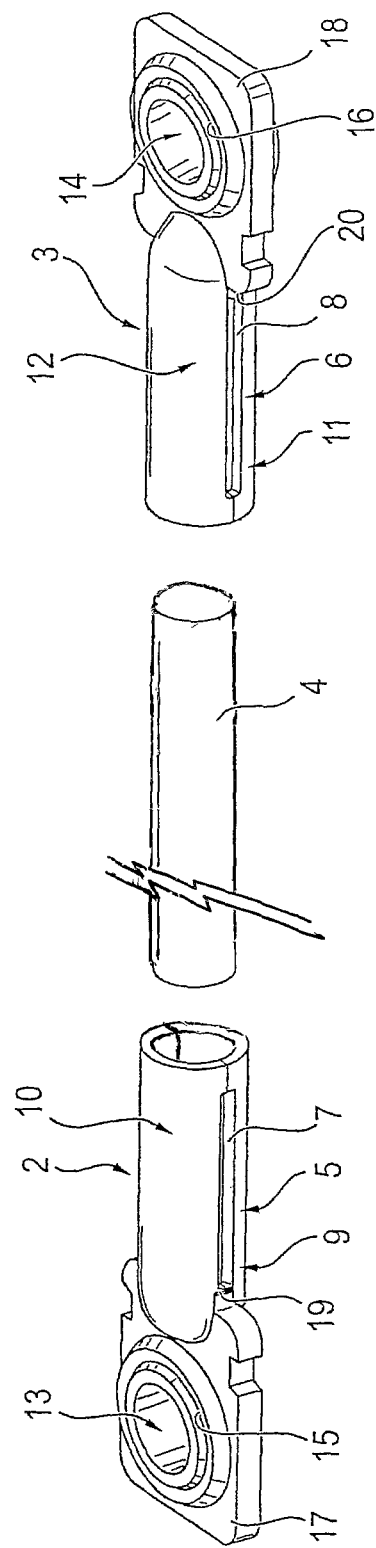
FIG. 9 shows the connecting rod in exploded view.

FIGS. 7 and 8 show different views of an exhaust-gas turbocharger 1 in which the actuator 25 is installed with a direction of action which differs from the direction of action of the VTG outside lever 28. It is possible in the case of such a turbocharger design, too, for use to be made of the coupling rod 1 as per FIG. 1 with its compensating ball joints 13 and 14.

In addition to the above written disclosure of the invention, reference is explicitly made to the illustration in FIGS. 7 to 8 to supplement the disclosure of the invention.

Now that the invention has been described,

LIST OF REFERENCE SIGNS

1, 1' Coupling rod
2 First end piece
3 Second end piece
4, 4' Intermediate piece/connecting rod
5, 6 Sleeves
7, 8 Welding windows
9, 10, 11, 12 Sheet-metal halves
13, 14 Spherical joints
15, 16 Receiving recess
17, 18 Holding plate
19, 20 Insertion slot
21 Exhaust-gas turbocharger
22 Turbine
23 Compressor
24 Bearing housing
25 Actuator
26 Actuator lever
27 VTG outside lever
28 Cranked VTG outside lever

We claim:

1. A coupling rod fitting (1) adjustable in axial length, comprising
a first end piece (2) including a first connector;
a second end piece (3) including a second connector; and
a connecting rod (4) having a first end and a second end,
wherein the connecting rod (4) first end and second ends are cylindrical,
wherein the first end piece (2) is assembled from two sheet-metal halves (9, 10) together forming a sleeve (5) with a cylindrical recess adapted to receiving the connecting rod (4) first end,
wherein the second end piece (3) is assembled from two sheet-metal halves (11, 12) together forming has a sleeve (6) with a cylindrical recess adapted to receiving the connecting rod (4) second end,
wherein the sleeves (5, 6) have in each case an axially elongate welding window (7 and 8 respectively) between the two sheet-metal halves (9, 10 and 11, 12 respectively),
wherein the coupling rod fitting (1) is adapted for forming a coupling rod by pushing the sleeves (5, 6) at least part way onto the first and second ends of the connecting rod (4), wherein the sleeves (5, 6) are adapted to be fixed to the connecting rod (4) by means of a cohesive connection through the axially elongate welding windows, and wherein the effective length of the coupling rod is adapted to be varied by varying the final assembly position of the sleeves (5, 6) on the connecting rod (4) and by varying the position of the cohesive connection on the end pieces (2, 3) and on the connecting rod (4).

2. The coupling rod fitting as claimed in claim 1, wherein the sleeves (5, 6) have in each case one welding window (7 and 8 respectively).

3. The coupling rod fitting as claimed in claim 1, wherein at least one connector is a compensating ball joint (13 and 14 respectively).

4. The coupling rod fitting as claimed in claim 3, wherein each end piece includes a holding plate (17, 18), wherein both connectors are compensating ball joints (13, 14) and wherein the compensating ball joints (13, 14) are arranged in, in each case, one receiving recess (15 and 16 respectively) provided in the associated holding plate (17 and 18 respectively).

5. The coupling rod fitting as claimed in claim 4, wherein the holding plates (17, 18) are in each case inserted into and fixed in an associated insertion slot (19 and 20 respectively) of the associated sleeves (5 and 6 respectively).

6. The coupling rod fitting as claimed in claim 1, wherein the connecting rod (4) is straight.

7. The coupling rod fitting as claimed in claim 1, wherein the connecting rod (4') is cranked.

8. An exhaust-gas turbocharger comprising
a compressor (23),
a turbine (22), a bearing housing (24) arranged between the compressor ((23) and turbine (22), an actuator (25) fastened to the compressor (23), an outside lever (27) of a VTG cartridge provided outside the turbine (22), a coupling rod extending between the actuator (25) and outside lever (27), the coupling rod formed from a coupling rod fitting (1) adjustable in axial length, comprising

- a first end piece (2) including a first connector;
- a second end piece (3) including a second connector; and
- a connecting rod (4) having a first end and a second end, wherein the connecting rod (4) first end and second ends are cylindrical, wherein the first end piece (2) is assembled from two sheet-metal halves (9, 10) together forming a sleeve (5) with a cylindrical recess adapted to receiving the connecting rod (4) first end, wherein the second end piece (3) is assembled from two sheet-metal halves (11, 12) together forming has a sleeve (6) with a cylindrical recess adapted to receiving the connecting rod (4) second end, wherein the sleeves (5, 6) have in each case an axially elongate welding window (7 and 8 respectively) between the two sheet-metal halves (9, 10 and 11, 12 respectively), wherein the coupling rod fitting (1) is adapted for forming a coupling rod by pushing the sleeves (5, 6) at least part way onto the first and second ends of the connecting rod (4), wherein the sleeves (5, 6) are adapted to be fixed to the connecting rod (4) by means of a weld connection through the axially elongate welding windows, and wherein the effective length of the coupling rod is adapted to be varied by varying the final assembly position of the sleeves (5, 6) on the connecting rod (4) and by varying the position of the weld connection on the end pieces (2, 3) and on the connecting rod (4).

\* \* \* \* \*